2,528,590

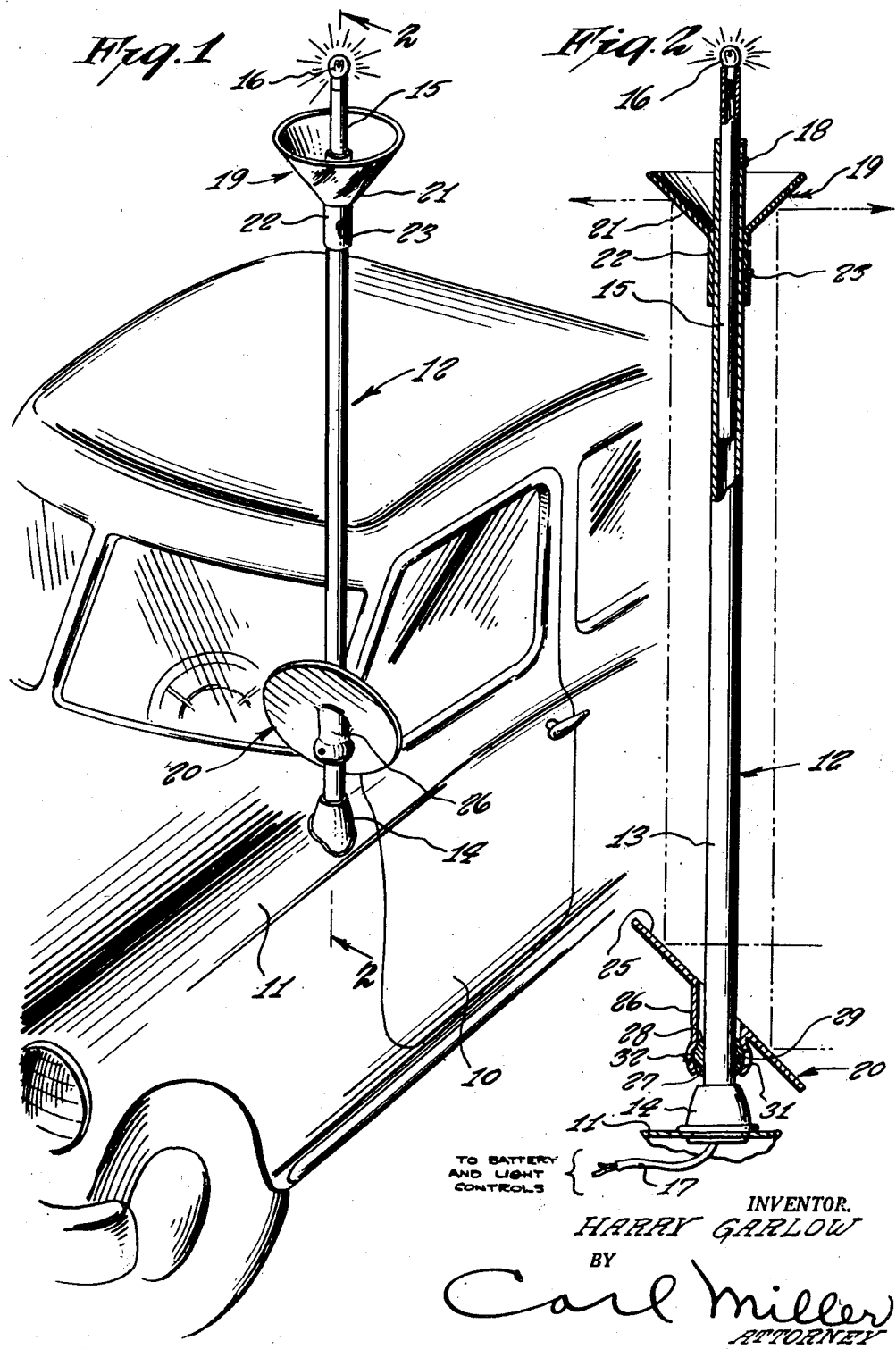
Nov. 7, 1950 — H. GARLOW — 2,528,590
AUTOMOBILE MIRROR FOR PROVIDING A 360° VIEW TO THE DRIVER
Filed March 10, 1949
INVENTOR.
HARRY GARLOW
BY Carl Miller
ATTORNEY Patented Nov. 7, 1950

UNITED STATES PATENT OFFICE 2,528,590

AUTOMOBILE MIRROR FOR PROVIDING A 360° VIEW TO THE DRIVER

Harry Garlow, Flemington, N. J.

Application March 10, 1949, Serial No. 80,602

1 Claim. (Cl. 88—85)

This invention relates to a combined automobile mirror, radio antenna and light construction.

It is an object of the present invention to provide a combined automobile mirror, antenna and light construction which will permit the user of the automobile to have vision upon his mirror from all directions and also to provide a top light upon the antenna which will give light to all directions from the automobile and wherein at the same time the support for the mirror arrangement and the light provides the radio antenna.

Other objects of the present invention are to provide a combined mirror, radio antenna and light construction which is simple, easy to install upon the automobile, inexpensive to manufacture, consumes little space and efficient in operation.

For other objects and for a better understanding of the invention, reference may be had to the following detailed description taken in connection with the accompanying drawing, in which Fig. 1 is a perspective view of an automobile and of the combined device embodying the features of the present invention.

Fig. 2 is a fragmentary vertical sectional view taken generally on line 2—2 of Fig. 1.

Referring now to the figures, 10 represents an automobile having a cowl 11 to which is connected my device indicated generally at 12 and adapted to extend upwardly in the same manner that the usual radio antenna is extended.

My device 12 includes a long pipe 13 which is fixed at its lower end to a bracket support 14 which is in turn connected rigidly to an opening in the top of the cowl. The pipe 13 contains a vertically adjustable small pipe 15 in its upper end and on the upper end of which there is fitted a lamp bulb 16. Wires 17 extend upwardly through the pipe for connection with the lamp bulb 16 to light the same. These wires 17 may be connected to the car battery and controlled by a separate switch on the dashboard of the automobile. The small pipe is held in its adjusted position by a set screw 18. The pipes may serve as the antenna for the radio as well as a support for the lamp bulb 16. With the lamp bulb extending a sufficient distance above the top of the automobile, light can penetrate in all directions so that vision can be had about the entire vehicle.

In order that the view can be had from the driver's station, there is mounted upon the outer pipe 13 and vertically spaced from one another, upper and lower mirrors 19 and 20. The upper mirror is of cone shape and has an exterior mirror surface 21 and a depending sleeve attaching portion 22 which is made secure on the pipe by a set screw 23. This conical mirror can be adjusted vertically to any desired height on the pipe 13 when the set screw 23 is released.

The lower mirror 20 has an inclined mirror surface portion 25 which faces the driver of the automobile and can be adjusted about the pipe from its depending sleeve portion 26 of substantially greater interior diameter than the diameter of the pipe 13 and which is provided with a rounded seat 27 for receiving a ball sleeve 28 adjustable upon the pipe 13 and adapted to be held in place by a set screw 29 accessible through an opening 31 in the seat or socket portion 27. Accordingly, this arrangement permits the mirror portion 25 to be adjusted on the ball 28 to give it a different tilt or angle and to rotate upon its vertical axis and about the pipe 13. Objects which are picked up by the conical mirror 19 are transmitted to the lower mirror 20 to be viewed by the driver of the automobile. The lower mirror 20 is held in its tilted position by a set screw 32 and upon the ball 28 against rotational displacement.

While various changes may be made in the detail construction, it shall be understood that such changes shall be within the spirit and scope of the present invention as defined by the appended claim.

Having thus set forth and disclosed the nature of my invention, what is claimed is:

A mirror construction for automobiles comprising a vertical support mounted to said automobile in vertical position, a lower substantially flat mirror disposed in a plane forming an acute angle with the axis of said support and mounted rotatably upon the axis of said support on the lower end of the latter, and an inverted conical upper mirror secured to the upper end of said support, said lower and upper mirror combined providing a 360° view to the driver of the automobile upon rotating said lower mirror upon the axis of said support.

HARRY GARLOW.

REFERENCES CITED

The following references are of record in the file of this patent:

UNITED STATES PATENTS

| Number | Name | Date |
|---|---|---|
| 1,311,087 | Olmstead | July 22, 1919 |
| 1,653,575 | Kirtane | Dec. 20, 1927 |
| 1,964,873 | Dujardin | July 3, 1934 |
| 2,161,771 | Alexander | June 6, 1939 |
| 2,281,102 | Lawman | Apr. 28, 1942 |

FOREIGN PATENTS

| Number | Country | Date |
|---|---|---|
| 16,551 | Great Britain | July 15, 1909 |